(No Model.)
G. H. BABCOCK.
METHOD OF OPERATING AIR OR GAS ENGINES.
No. 334,154. Patented Jan. 12, 1886.
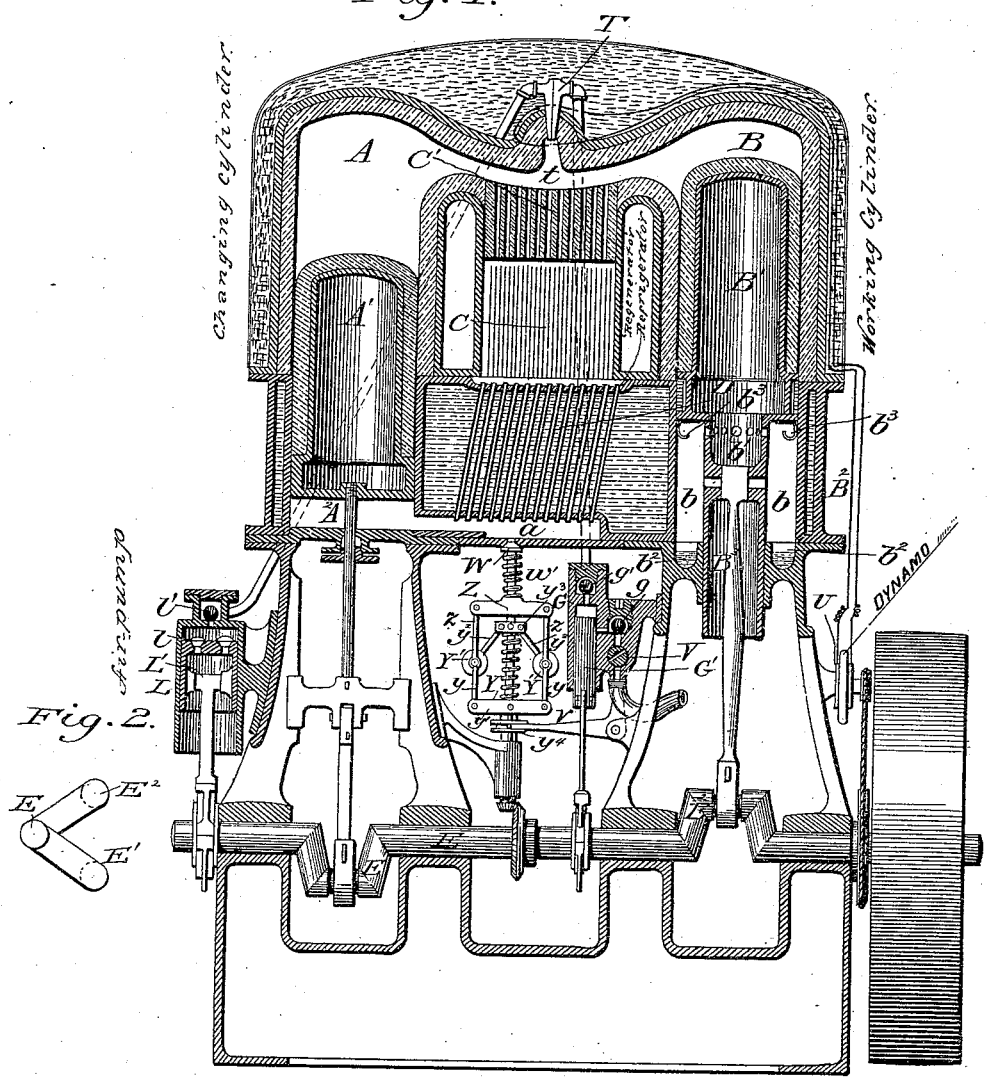
Witnesses:
E. D. Smith
Inventor:
Geo. H. Babcock
by Henry Calver
Atty.

UNITED STATES PATENT OFFICE.

GEORGE H. BABCOCK, OF PLAINFIELD, NEW JERSEY.

METHOD OF OPERATING AIR OR GAS ENGINES.

SPECIFICATION forming part of Letters Patent No. 334,154, dated January 12, 1886.

Application filed June 29, 1885. Serial No. 170,119. (No model.)

*To all whom it may concern:*

Be it known that I, GEORGE H. BABCOCK, a citizen of the United States, residing at Plainfield, in the county of Union and State of New Jersey, have invented certain new and useful Improvements in Methods of Operating Air or Gas Engines, of which the following is a specification, reference being had therein to the accompanying drawings.

My invention relates to the same general class of air or gas engines as those shown and described in my applications Nos. 129,504 and 129,574, filed April 28, 1884, and to that shown and described in my application No. 170,120, filed simultaneously herewith, the present invention relating to a certain method of operating an engine of the class in which the same actuating-fluid is repeatedly heated and cooled by introducing a combustible gas, together with a proportionate supply of oxygen, into said fluid, and thus securing and maintaining combustion within a fluid which of itself is incapable of supporting combustion.

This application is a division of my application No. 129,504, above referred to, and although the mechanism whereby my present invention is carried into effect is herein shown as being the same as that shown and described in my said application, I do not wish to be understood as limiting my present invention to the particular form of engine which is hereinafter described, although such engine embraces what I consider as the best means for carrying my invention into effect.

In all of my applications above referred to I have claimed certain features of invention different from that which is hereinafter claimed, and I hereby disclaim in this application all inventions claimed in my other said cases.

In the drawings, Figure 1 is a vertical sectional view of an engine for carrying my invention into effect, and Fig. 2 is a detail view showing the relative arrangement of the cranks of the main shaft.

A indicates the changing-cylinder, and B the working-cylinder; A′, the changing-piston, and B′ the working-piston; C and C′, the regenerator; D, the refrigerator, and $A^2$ and $B^2$ the water-jacketed portions of the cylinders, all performing the same functions and in the same general way as those described in my application No. 129,574, above referred to, and which in their general operation are similar to those of other well-known engines of this class, except as hereinafter more specifically described. In this form of my invention, however, the air-pump L and gas-pump G deliver the air and the gas to a compound burner, T, situated within the passage between the changing-cylinder A and the working-cylinder B. This combustion being similar in effect to the compound blow-pipe, produces an exceedingly high temperature, which the ordinary metal surfaces cannot successfully stand, and it is necessary to have the entire interior of the cylinders A and B lined with a substance not only non-conducting, but refractory—fire-brick, for example, or a mixture of plumbago and clay, such as is used for crucibles, capable of withstanding these very high temperatures. I also cover the exterior of the upper ends of the piston A′ and B′ with a similar refractory material for the same reason. I also make a portion of the regenerator C′ of a similar refractory substance, preferably as follows: I mold in a properly-formed mold the fire-clay or mixture of clay and plumbago or other refractory material, placing in the same a large number of thin rods of wood, similar to match-splints, practically parallel to each other, so that when the said brick is properly fired these match-splints will be burned, and upon removal of the ash will leave a series of small tubes or passages through the brick, as represented, though other means may be used for producing a highly porous structure of a refractory character, which will admit of the proper passage of the air to and from the different ends of the cylinder A, and perform the functions of a regenerator. Below this portion of the regenerator C′, I place the usual metallic plates, C, which serve to take out most of the remaining heat from the air after the more intense heat has been taken up by the refractory portion C′.

For the purpose of igniting the gas or other fuel supplied to the compound burner T, I prefer to employ an electric spark, which may be generated by means of a small dynamo, U, driven from the engine, or by a battery and a Remkorff coil or other convenient means. After a few revolutions the surfaces of the refractory lining adjacent to the compound burner T will become so highly heated that they will act as igniters for the charge, when, if desired, the electric arrangement may be stopped. Other well-known means may be employed for igniting the charges.

The air-pump L and the gas or fuel pump G are shown as driven from the main shaft E by means of an eccentric with a constant throw; but in some instances it may be desirable to have a variable throw to one or both, which may be attained in the manner shown in my application No. 129,574, above referred to, or by other well-known means.

In order to vary the amount of gas or fuel supplied through the pump G when the same has a constant throw, as shown, I employ a valve, V, in the induction-passage of the said pump, which will admit a greater or less amount of gas into the pump, according as the valve V is less or more closed. I attach this valve, as shown, to the governor through the bell-crank $v$, so that variations in the speed of the engine shall automatically close or open the same, and thus determine the amount of gas admitted to the pump G. The ratios in the sizes of the pumps G and L are such that there will be sufficient air or oxygen supplied by the pump L for the complete combustion of the greatest amount of gas supplied by the pump G. If, therefore, the pump G is caused to supply a less amount of gas, the oxygen supplied by L will be in excess, which fact will be of no serious disadvantage. In the bottom of the passage $a$ connecting with the lower end, $A^2$, of the changing-cylinder I place a pressure-valve, W, held to its seat by the spring $w'$. The governor Y is of peculiar construction. The balls Y' are attached to nearly vertical levers or arms $y$, hinged to the revolving piece $y'$. Other arms, $y^2$, connect these balls with a sliding collar, $y^3$, upon the governor-shaft in a well-known manner, which is acted upon by a spiral spring to resist the outward motion of the balls. This movable collar $y^3$ is connected, through a rod in the hollow shaft, with the sliding collar, $y^4$, which in turn actuates the bell-crank lever $v$. Other arms, $z$, nearly vertical, connect the balls $y'$ with another sliding collar, Z, on the governor-shaft above the collar $y^3$. The arms $y z$, being nearly vertical, admit of a considerable radial motion to the balls $y'$ without varying the position materially of the collar Z, but which motion will vary materially the position of the collar $y^3$, and through it the collar $y'$, the bell-crank $v$, and the valve V. The adjustment is such that when this motion has sufficed to close the valve V, or nearly close it, the arms $y z$ have become sufficiently inclined from the vertical to produce a variation in the position of the collar Z, and thereby reduce the pressure of the spring $w$, which holds the valve W to its seat. The governor Y is shown as driven from the main shaft E by beveled gears, or it may be driven in any other well-known manner.

I prefer to construct the pump G with the induction-passage $g$ considerably below the upper end of the stroke of the plunger G', whereby the lost space in the passage $g$ need not be filled with the gas in its highest compressed condition, and after the plunger G' has passed the port $g$ it will continue to compress the gas in the end of the barrel of the pump G, and deliver the same at the pressure within the engine through the valve $g'$. By this arrangement the amount of lost space in the passage $g$ is of less detriment to the proper working of the pump. It is evident that the pump L may be constructed in a similar manner, though it is not so shown.

I construct the piston B' with a trunk, $B^3$, for the purpose of steadying its motion and guiding it properly, and I connect the annular space $b$ between the trunk $B^3$ and the cylinder $B^2$ with the interior of the said trunk by holes $b'$, so that the air in the annular space $b$ may pass freely out and in as the piston rises and falls without producing any back-pressure. This air will also serve to keep the said piston B' cool by conveying away the heat which is connected through the piston to the interior. Below the cylinder $B^2$, I provide an annular oil-space, $b^2$, and attach to the piston B' elastic dependents $b^3$, which at the lowest positions of the piston will reach down into the annular oil-space $b^2$ at each revolution, and on the return of the piston carry the oil up and deposit it on the surfaces of the cylinder $B^2$, keeping the latter well lubricated. Exterior to the cylinders A and B, I place a covering of mineral wool or other non-conductor, and inclose the same in a jacket, as shown, to prevent radiation of the heat from the cylinders.

In the management of this engine I place the hot ends of the cylinders at the top and the cold ends at the bottom, which I am enabled to do in consequence of the use of the internal combustion for heating the air, in place of heating the same by convection through the surfaces of the cylinders, as has heretofore been done in engines of this class. By this I attain a specific advantage in preventing the rapid convection of the heat from the hot to the cold ends of the cylinders.

The operation of the engine is as follows: The interior of the cylinders A and B being filled with atmospheric air or other gas at a proper pressure, which may be greater than that of the atmosphere, the revolution of the crank-shaft E draws the piston A' from the top to the bottom of the cylinder A $A^2$, and thereby causes the air from the cold end of $A^2$ of the changing-cylinder to be transferred to the hot end A through the passage $a$, refrigerator D, and regenerator C C' at the same time that the pumps L and G deliver to the compound burner T a quantity of fuel and oxygen, which being ignited by the electric spark from the dynamo U heats up this air to a high temperature, increasing its pressure and forcing outward the working-piston B', which acts upon the crank E² to continue its revolution. As the piston B' moves outward and the heated air in A and B expands, the changing plunger or piston A' is caused by the crank E' to return to the upper end of the cylinder A, forcing the air therein down through the regenerator C' C, in which passage the most intense heat of the air is taken up by the refractory portion C' of the regenerator, the less intense is taken up by the part C of said regenerator, and the small remaining portion of heat not so stored up is taken out by the refrigerator D; hence the air passes into the lower end of the changing-cylinder A² much reduced in temperature, and consequently in pressure. The piston B' then returns by the momentum of the fly-wheel, forcing the remaining air in the upper part of the cylinder B also into the lower part of the changing-cylinder A², storing its heat in its passage, when by the continual revolution of the crank-shaft the changing-piston A' is again forced to the bottom of its cylinder by the crank E' and the same cycle of operation is repeated.

It will be observed that as the products of combustion are mingled directly with the fluid within the engine this fluid rapidly becomes so largely composed of carbonic acid as to be of itself a non supporter of combustion. This fact has hitherto prevented the use of the products of combustion within an engine of this character; but by supplying a proper amount of oxygen with the fuel at each stroke I am enabled to burn the fuel, notwithstanding it is surrounded by the carbonic acid within the engine. That portion of the gas supplied by the pump G, which is hydrogen, will by combination with the oxygen during combustion produce steam, and this, when it comes in contact with the refrigerator D, will be condensed and fall into the lower portion of the passage a.

The pump L, if used to pump atmospheric air, will supply, with the oxygen, a portion of nitrogen, which, together with the carbonic acid of combustion, will increase the amount of fluid in the engine to a small extent at each stroke. If this increase were not checked in any way, it would soon come to be so great as to cause inconvenience. Therefore the pressure-valve W is provided, which will open when the pressure within the cylinder exceeds a proper limit. The valve W being in the bottom of the passage a, will when open deliver first the water which lies within that passage, and afterward a portion of the air or gas until the pressure is brought to the proper standard. When the speed of the engine becomes sufficient to cause the balls $y'$ of the governor $y$ to expand against the resistance of the spring, their first motion will be to act upon the bell-crank V, closing the valve $v$ and shutting off to a less or greater extent the amount of gas supplied to the pump G, which will reduce the temperature within the engine, and thereby reduce the power and speed. Should this not be sufficient, however, the still increasing speed will cause the balls Y' to expand still further, lowering the collar Z, and relieving to some extent the pressure upon the valve W, thereby letting out a portion of the pressure within the engine, thus reducing its power and speed to the proper amount.

The compound burners T may be so made that the passage for the air shall completely surround the passage for the gas or vapor fuel, or they may in any way be made to impinge upon each other at the point of issue. As the object is simply to produce a perfect mixture of the gases just at the point of combustion, I do not desire to limit myself to any particular construction of the burner T. When a hydrocarbon gas or vapor is burned with its proper supply of air, it produces an exceedingly intense flame of the temperature of 5,000°, and upward. This temperature is of course much too high to admit of use directly in the interior of a gas-engine, and it is only by the mixture of the products of combustion at this temperature with the much larger volume of air or other fluid within the engine that the temperature is brought down to a practicable intensity. It is desirable, for the purposes of economy of power and of attaining a larger power with a smaller engine, that this intensity should be as great as the surfaces of the engine can be made to withstand. It is for this reason that I line all the portions of the interior of my engine which come in contact with the intensely-hot gases with a non-conducting refractory substance, whereby I am enabled to use a temperature within the engine greater than any hitherto employed. It will be noted that no part of the metal work of my engine at any time comes in direct contact with the highly-heated working-fluid. As iron commences to lose its tensile strength at 600° Fahrenheit, and the strength is reduced very rapidly as the temperature rises above that point, the importance of this thorough protection of all parts of the iron-work from the highly-heated gases is apparent, as at times the temperature within the engine may rise to 1,000° or 1,500° to produce the best effects. Such high temperatures are not desirable or economical in ordinary gas-engines, for the reason that too large a proportion of the heat would be discharged with the exhaust. Neither have such high temperatures been attainable heretofore in any engine in which the same fluid is alternately heated and cooled, as it has been found impossible to transmit any such high temperatures through the metallic heaters heretofore employed in such engines.

The firing of an explosive mixture of gas within the cylinder of an engine for the purpose of producing power is a well-known device. My invention differs therefrom in several particulars. Though an explosion within the engine is permissible in some cases, I usually prefer to produce a gradual combustion of the fuel at the point of entrance, and thereby heat other air or gases than those which compose the combustible mixture, which air or gases are not discharged at each stroke of the engine, as in other gas-engines, but are used over and over in the same cylinders. The advantage of this method will be rendered more apparent by a consideration of the fact that a given weight of the products of combustion mingled with the fluid within the engine will heat thirty times its own weight of fluid to 1,500°, provided there is but ten per cent. (the amount allowed in practice) of the total heat rejected through the refrigerator D, and will heat fifty times its own weight, or even a larger proportion, provided the temperature within the engine is carried at 1,000°, or at a still lower intensity.

Should the pump G be used to supply the hydrogen and the pump L oxygen only in proper proportions for combustion, the resultant would be, after passing through the refrigerator D, only water, and the fluid in the engine would not be materially increased thereby. In this case the valve W would have no function to perform except to withdraw that water from the passage $a$; but when the pump G supplies a hydrocarbon fuel, or the pump L supplies atmospheric air, then the amount of fluid in the engine will be increased about three per cent., or less, at each revolution, and the valve W will be called upon to remove this excess when the power or the speed becomes too great.

It will be found advisable in practice, provided the normal pressure within the engine is above that of the atmosphere, to employ a double engine in which the normal pressures upon the pistons B' may be made to balance each other, either by working directly opposite and being connected rigidly, or by working upon opposite cranks of the same shaft, or upon opposite ends of a beam in a well-known manner; but I have preferred to show this engine herein as a single-acting engine, for the purpose of simplicity in the drawings, the operation in the double engine being in no wise different from that herein described. The air and gas pumps could, however, be made double-acting in such case advantageously. If the normal pressure within the engine is not greater than that of the atmosphere, it will be possible, by using a high temperatue of, say, 1,500°, or even less, in the hot end, to run a single-acting engine of this character without an excessively large fly-wheel. The operation in that case would be as follows: The normal pressure when the piston B' is at the inner end of its stroke being that of the atmosphere—fifteen pounds and 100° temperature—the changing of the air within the changing-cylinder from the cold to the hot end through the regenerator and addition of heat through the burner T, elevating it to 1,500°, would produce a pressure of about fifty pounds, less the reduction due to lost space, which, acting upon the piston B', and through the crank $E^2$, would exert a power to cause the shaft E to revolve, when by the expansion of the fluid the pressure would fall at the end of the stroke of the piston B' to about twenty-five pounds. When, now, the piston A' returns and forces the air back through the regenerators and the refrigerator, thus cooling the air down to the normal temperature, 100°, the pressure within the engine will be less than that of the atmosphere, or about eight pounds, leaving seven pounds pressure acting upon the piston B' to force it back into the cylinder B and exert an additional impulse to the revolution of the engine. For small powers an engine thus constructed and operated will be found to be simple and efficient.

I do not wish to be understood as claiming the invention described by British Patent No. 2,074 of 1860, relating to engines in which the combustion takes place in a special combustion-chamber, my invention comprising the burning of the gases within the actuating-fluid in the main chamber of the engine and behind the working-piston, as indicated by the claims.

Having thus described my invention, I claim and desire to secure by Letters Patent—

1. In an air or gas engine in which the same actuating-fluid is repeatedly heated and cooled, the method of securing and maintaining combustion within said fluid by introducing a combustible gas within the engine, together with a proportionate quantity of oxygen, and burning the gaseous fuel within the actuating-fluid in the main chamber of the engine and behind the working-piston, substantially as set forth.

2. The method of operating an air or gas engine in which the same actuating-fluid is repeatedly heated and cooled, and of securing and maintaining combustion within a fluid which of itself is incapable of supporting combustion by introducing a measured quantity of combustible gas or vapor within said engine, together with a proportionate quantity of oxygen, mixing these gases together and burning the same within the actuating-fluid in the main chamber and directly behind the working-piston before they are mingled with the fluid of the engine, substantially as set forth.

In testimony whereof I affix my signature in presence of two witnesses.

GEO. H. BABCOCK.

Witnesses:
  NAT. W. PRATT,
  S. WILCOX.